United States Patent [19]

Katsumata et al.

[11] 4,272,819
[45] Jun. 9, 1981

[54] INTER-SUBSYSTEM DIRECT TRANSFER SYSTEM

[75] Inventors: Yutaka Katsumata, Inagi; Mitsuru Sanagi; Hideo Tanaka, both of Yokohama, all of Japan

[73] Assignee: Fujitsu Limited, Tokyo, Japan

[21] Appl. No.: 24,032

[22] Filed: Mar. 26, 1979

[30] Foreign Application Priority Data

Mar. 31, 1978 [JP] Japan .................................. 53-37920

[51] Int. Cl.$^3$ ............................................. G06F 15/16
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,815,096 | 6/1974 | Nahon | 364/900 |
| 3,976,979 | 8/1976 | Parkinson et al. | 364/200 |
| 4,067,059 | 1/1978 | Derchak | 364/200 |
| 4,120,028 | 10/1978 | Membrino et al. | 364/200 |

Primary Examiner—Raulfe B. Zache

Attorney, Agent, or Firm—Staas & Halsey

[57] ABSTRACT

In an inter-subsystem communication system which has a communication queue enqueued by one subsystem having processors and dequeued by another subsystem having processors, there is provided between the subsystems direct memory access means which permits either of the subsystems to directly access a memory of the other subsystem, and in a queue element enqueued by the one subsystem is inserted memory access control information necessary for accessing the one subsystem, whereby a high-grade function is performed by the plurality of subsystems. When the source subsystem issues an enqueue command, the queue element length of a queue element produced in response to the queue command is compared with a remaining space of the queue and, if the comparison result satisfies a predetermined condition, an overflow interruption is caused in the processor of the source subsystem, thereby to efficiently detect a queue overflow state or queue usable state.

10 Claims, 13 Drawing Figures

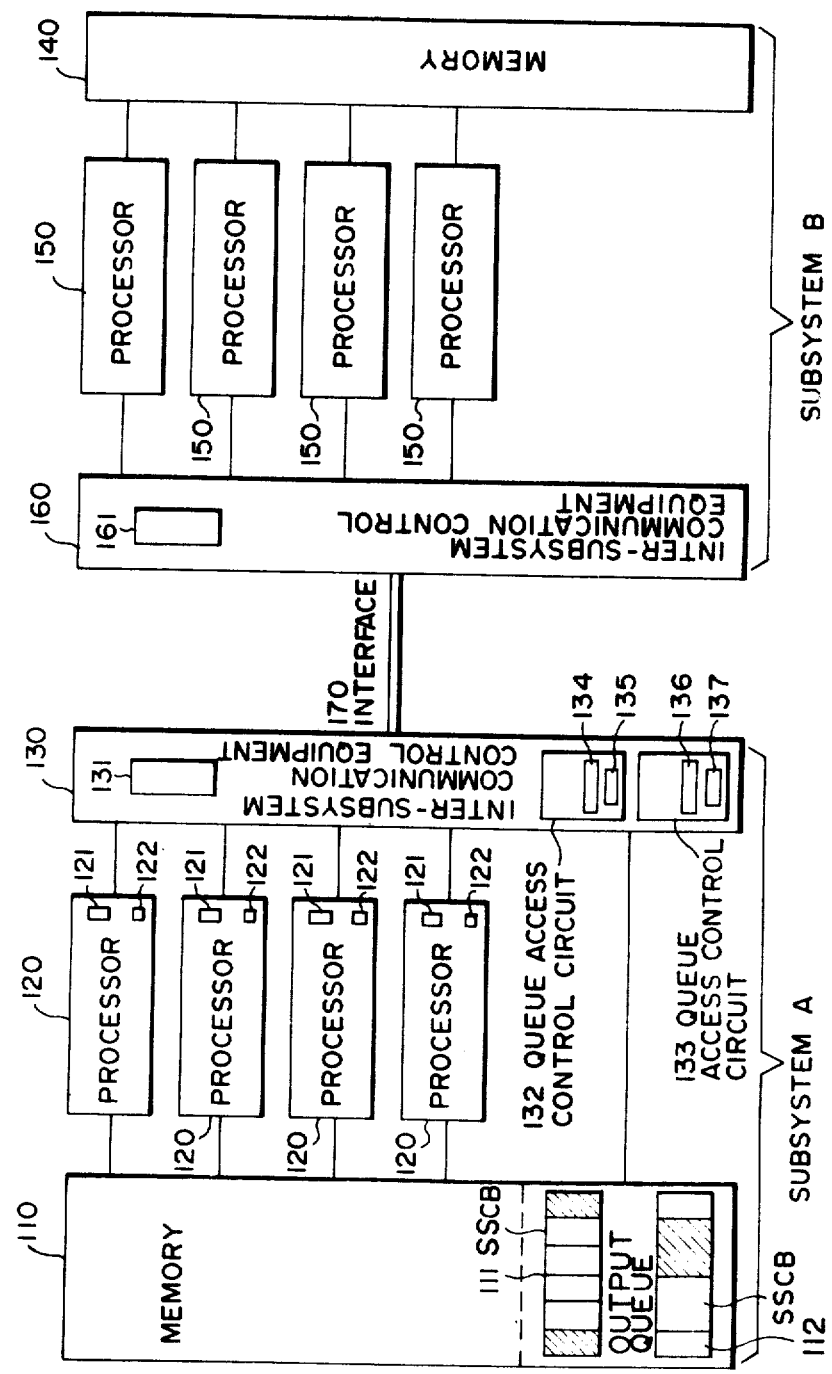

INTER-SUBSYSTEM DIRECT TRANSFER SYSTEM

BACKGROUND OF THE INVENTION

1. Field of the Invention

This invention relates to an inter-subsystem communication system employing communication queues, and more particularly to an inter-subsystem direct transfer system which is designed so that a memory of one of the subsystems can be accessed directly by an other subsystem and so that an overflow and an enable state of a queue can be efficiently detected in the inter-subsystem communication system.

2. Description of the Prior Art

FIG. 1 shows the outline of a conventional channel control system for communications between a host subsystem and an I/O subsystem through a channel. This includes a host processor 1; a channel 2; I/O subsystem. Upon receipt of an SIO (start I/O) instruction from the host processor 1, the channel 2 reads out the the i th channel command word CAW;) assigned by CAW (channel address word) to start input/ output control and, upon completion of the input/output operation, sends an interrupt signal to the host processor 1. This kind of channel control system presents the following problems:

(a) Since the host processor assigns a subchannel, the number of channels is limited.

(b) The host processor assigns a memory area and the channel is permitted to access only the memory area assigned by the channel command word CCW. In other words, the channel does not provide free access to the host memory.

SUMMARY OF THE INVENTION

Accordingly, this invention is intended to solve the abovementioned problems of the prior art.

A first object of this invention is to provide an inter-subsystem direct transfer system which enables a memory of a first subsystem to be directly accessed by a second subsystem without intervention by the processor in the first subsystem and permits high-grade functions to be performed by a plurality of subsystems.

A second object of this invention is to provide an inter--subsystem direct transfer system which enables a memory of a first subsystem to be accessed directly by a second subsystem without translation of a logical address to a physical one in a program in the second subsystem.

A third object of this invention is to provide an inter-subsystem direct transfer system which, for reading a page data set, from a physical address in the memory of a first subsystem, assigns that physical address in the first subsystem to permit a second subsystem to directly access a memory of the first subsystem based on a logical address.

A fourth object of this invention is to provide an inter-subsystem direct transfer system which utilizes a protection (PSW) key sent from a first subsystem to achieve storage protection of a memory of that first subsystem.

A fifth object of this invention is to provide an inter-subsystem direct transfer system which, in an inter-subsystem communication system employing queues, detects a queue overflow and a queue enable state with simple logic to achieve efficient queue overflow processing.

To achieve the above objective, in the inter-subsystem direct transfer system for an inter-subsystem communication system having a communication queue which is enqueued by a first of plural subsystems, each provided with a processor, and dequeued by a second, there is provided between the two subsystems a direct memory access means capable of accessing a memory of either subsystem, and memory access control information necessary for accessing the subsystem is inserted in the queue element which is enqueued by the subsystem. Further, in an inter-subsystem communication system in which a source subsystem enques a queue in a queue element and a destination subsystem dequeues the queue element from the abovesaid queue, thereby to conduct communication between the subsystems, when the source subsystem issues an enqueue command, a comparison is made between the queue element length of the queue element formed by the enqueue command and the remaining space of the abovesaid queue, and if the comparison result satisfies a predetermined condition an overflow interrupt is caused in a processor of the source subsystem.

BRIEF DESCRIPTION OF THE DRAWINGS

FIG. 11 is a diagram illustrating a second embodiment of the hardware structure of the inter-subsystem direct transfer system of this invention.

DESCRIPTION OF THE PREFERRED EMBODIMENTS

Figure 1:
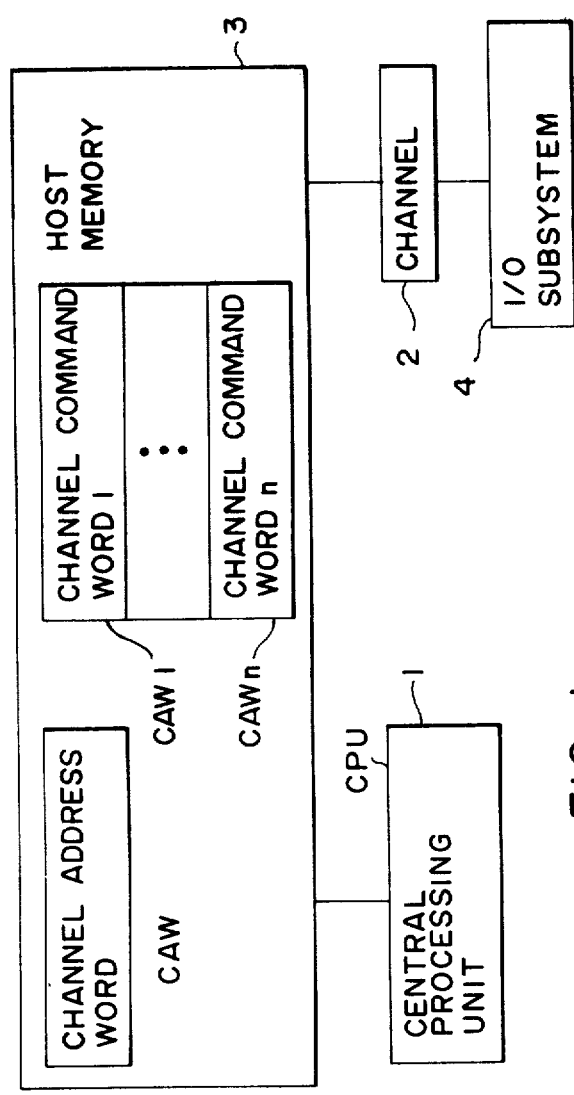
FIG. 1 is a schematic diagram showing the outline of a conventional channel control system.
Figure 2:
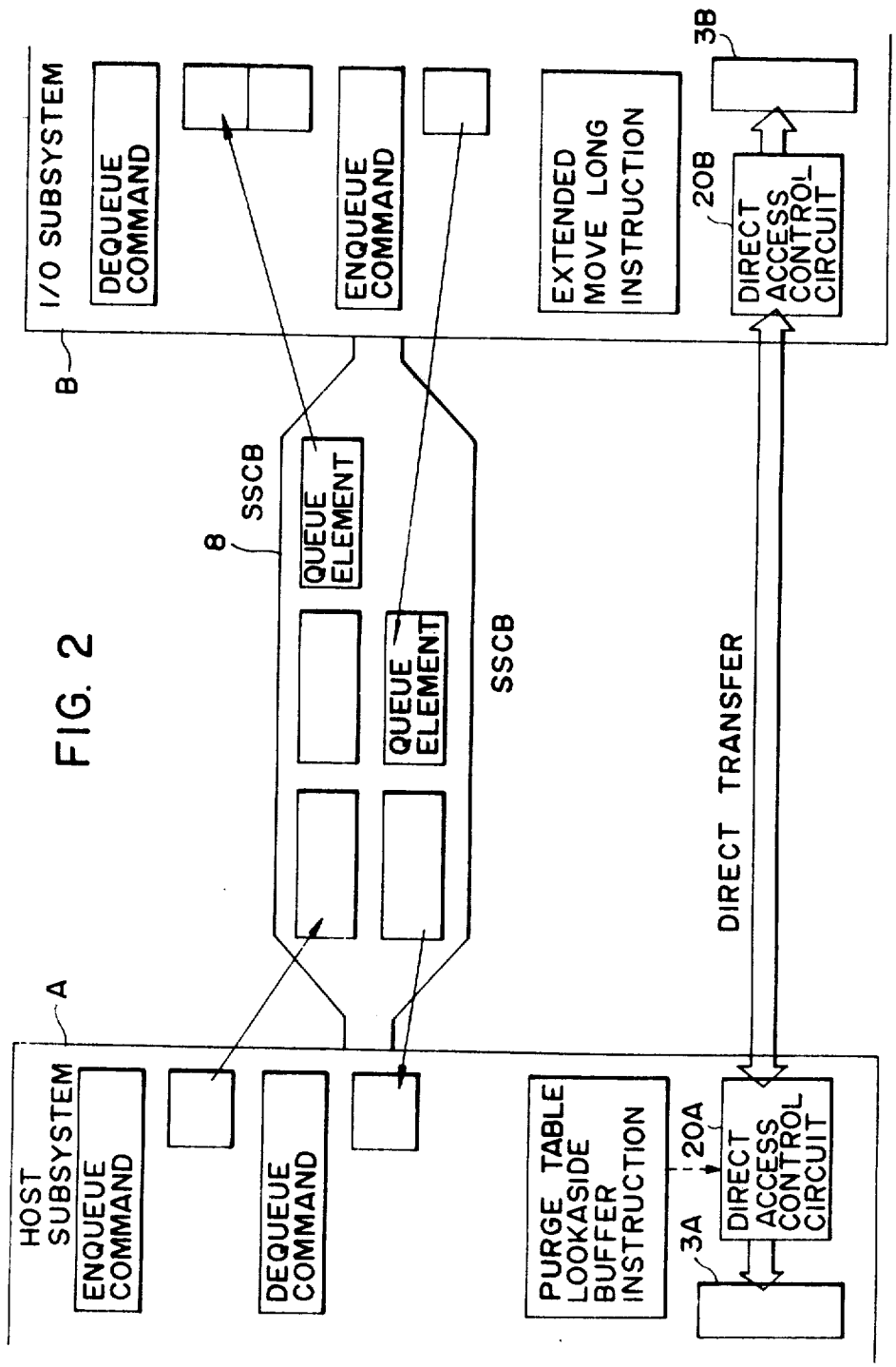
FIG. 2 is a schematic diagram showing the outline of the inter-subsystem direct transfer system of this invention.

FIG. 2 shows memories 3A and 3B; direct access control circuits 20A and 20B; a communication queue 8; subsystems A and B; and queue elements SSCB. In FIG. 2, it is assumed that the subsystems A and B are a host subsystem and an I/O subsystem, respectively.

When the host subsystem A addresses a request to the I/O subsystem, the former enqueues the queue elements SSCB in the communication queue 8. The queue elements SSCB enqueued by the host subsystem A are dequeued by the I/O subsystem B. The I/O subsystem B processes the request indicated by the queue elements SSCB and, upon completion of the processing, enqueues answering queue elements SSCB in the communication queue 8. The answering queue elements SSCB are dequeued by the host subsystem A to detect an answer to the request. When the I/O subsystem B processes the request from the host subsystem A, there are some occasions when data must be read out from or written in a memory of the host subsystem A. In such a case, the I/O subsystem B issues an EXMVL (Extended Move Long) instruction, by which address information and control information are sent to the direct access control circuits 20A and 20B. As a consequence, data are transferred from the memory 3A to 3B or vice versa. The above has described the case in which the subsystem A sends a request to the subsystem B and the latter answers back to the former; but, of course, there are cases where the subsystem A answers a request issued from the subsystem B.

Figure 3:
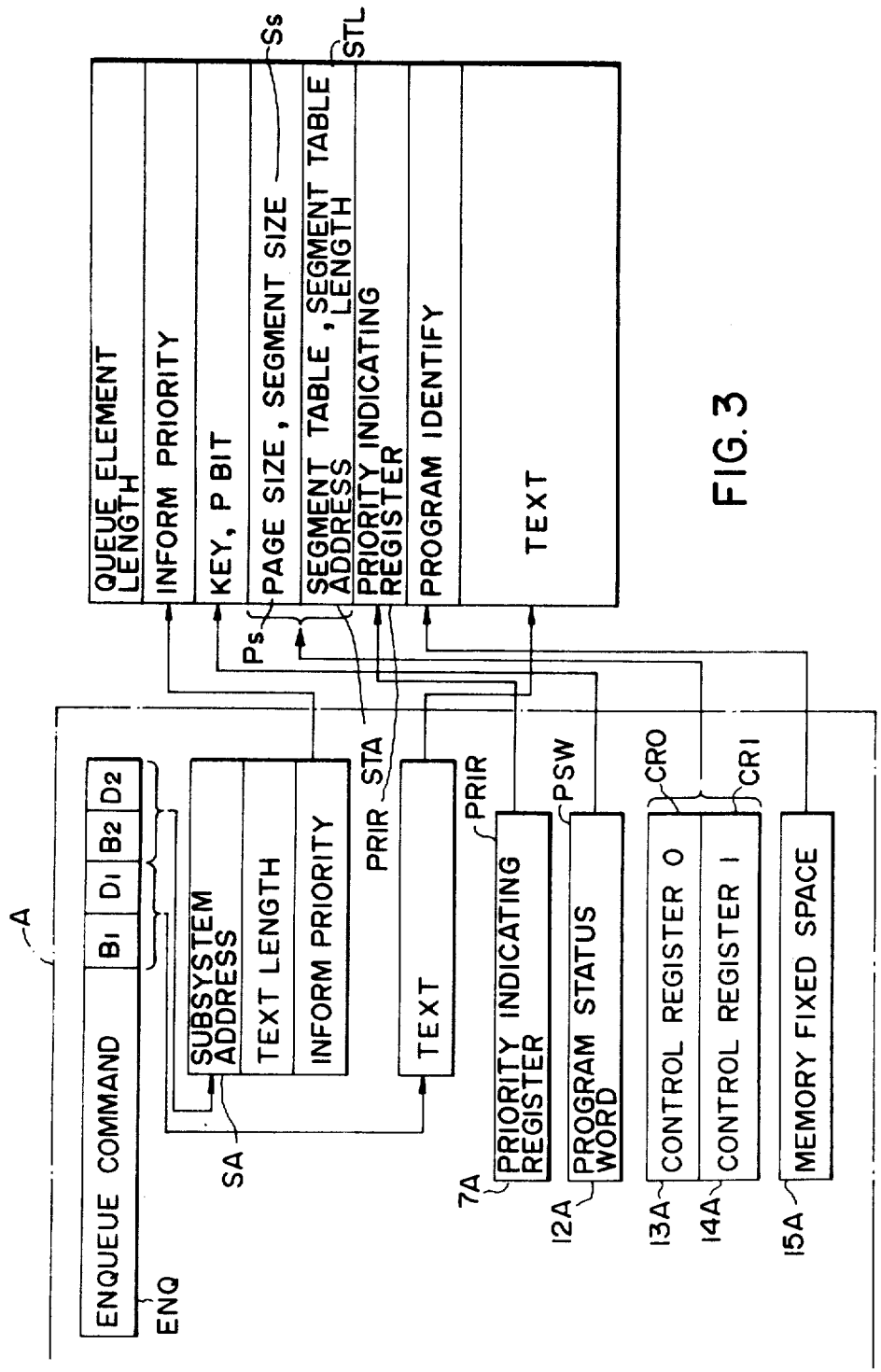
FIG. 3 is a diagram explanatory of the formation of an enqueue command and a queue element.

FIG. 3 is explanatory of the formation of the enqueue command and the queue elements SSCB. It shows a priority indicating register 7A; a program status control word 12A; a control register 0 13A; a control register 1 14A; a memory fixed space 15A; a program status word PSW key KEY; a bit P indicating whether the mode of operation is a problem or supervisor mode; a segment size SS; a page size PS; a segment table address STA; a segment table length STL; the content PRLR of the priority indicating register 7A; a program identify for identifying a program having issued an enqueue command; and TEXT the content of a request or answerback. The enqueue command has first and second operands. The first operand ($B_1$, $D_1$) assigns the text and the second operand ($B_2$, $D_2$) assigns the subsystem address, the text length and the inform priority of the destination subsystem. The queue element SSCB has, as parameters, the queue element length, the inform priority, the PSW key and P-bit, the segment size SS and the page size PS, the segment table address STA and the segment table length STL, the priority value of the priority indicating register, and the program identify of a program having issued the enqueue command and the text. As the PSW key, bits 8 to 11 of the program status word are inserted. The PSW key is used for storage protection when the memory 3A (or 3B) is accessed. As the page size PS, bits 8 to 9 of the control register 0 13A are inserted. As the segment table length STL, bits 0 to 7 of the control register 1 14A are inserted and, as the segment table address STA, bits 8 to 25 of the control register 1 14A are inserted. The page size PS, the segment size SS, the segment table length STL and the segment table address STA are included in the queue element SSCB issued from the host subsystem A and used as DAT (Dynamic Address Translation) control information when the I/O sybsystem B accesses the memory 3A of the host subsystem A using a virtual address.

Figure 4:
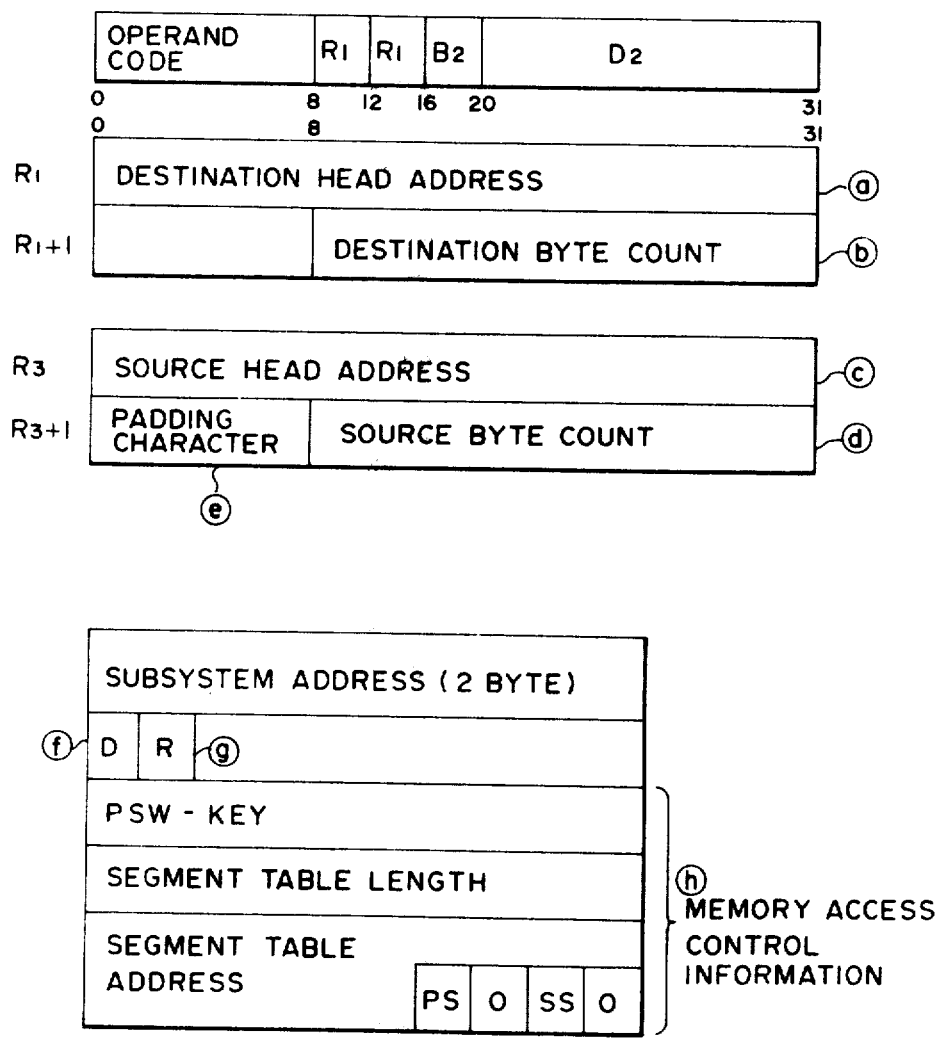
FIG. 4 is a diagram illustrating the format of an extended move long (EXMVL) instruction.

When the I/O subsystem B directly accesses the memory 3A of the host subsystem A, the former is supplied with host memory access control information by such means as mentioned above. Accordingly, when convenient, the I/O subsystem B can directly access the memory 3A of the host subsystem A without intervention of the processor of the host subsystem A. Next, a description will be given of the EXMVL instruction for executing direct access and a method of direct access. FIG. 4 is explanatory of the EXMVL instruction. The EXMVL instruction has a first operand part $R_1$, a second operand part $B_2$, $D_2$ and a third operand part $R_3$. The first operand part $R_1$ is to assign a register having stored therein a destination head address and a destination byte count, and the third operand $R_3$ is to assign a register having stored therein a source head address and a source byte count. In the address area assigned by the second operand $B_2$, $D_2$, there have been stored the other subsystem address SA, transfer direction assign information D, mode assign information R indicating whether or not the dynamic address transfer is carried out, a PSW key, a segment table address STA, a page size PS and a segment size SS. The transfer direction assign information D of logic "0" indicates that data should be transferred from the other subsystem. The transfer direction assign information D of logic "1" indicates that data should be transferred to the other subsystem. The mode assign information R of logic "0" indicates the execution of a dynamic address translation, that is, a virtual mode. The mode assign information R of logic "1" indicates non-execution of the dynamic address translation, that is, a real mode. The PSW key, the segment table length STL, the segment table address STA, the page size PS and the segment size SS make up memory access control information. The memory access control information stored in the address area assigned by the second operand $B_2$, $D_2$ of the EXMVL instruction is identical with the memory access information included in the queue element on which is based the issuance of the EXMVL instruction. Reference character PAD indicates a padding character.

Next, the operation of the EXMVL instruction will be described. In FIG. 2, the host subsystem A enqueues the queue elements SSCB in the communication queue 8, while the I/O subsystem B dequeues the queue elements SSCB from the communication queue 8. The I/O subsystem B arranges the dequeued queue elements in a dispatch queue (not shown) and processes requests assigned by the queue elements in accordance with priority. Now, let it be assumed that the text part of the queue element led out of the dispatch quene requests reading data of a file by the I/O subsystem in the memory 3A of the host subsystem A. In this instance, the text part has written therein the destination head address, the destination byte count and information such as the name of the data set and the number of blocks to be read out. The I/O subsystem B issues the EXMVL instruction for executing the request assigned by the queue element SSCB. The first operand part of the EXMVL instruction assigns the register in which the destination head address and the destination byte count of the text part are stored, and the third operand part assigns the counter in which are stored and head address and the byte count of a buffer area in the I/O subsystem in which are stored the blocks of the data set assigned by the text part. The transfer direction assign information D and the mode assign information R of the second operand $D_2$, $B_2$ are also determined by the content of the text part. As the memory access control information of the second operand $D_2$, $B_2$ is used the memory access information of the queue element SSCB requesting the reading. When executing the EXMVL instruction, if the processor having issued the instruction is in the virtual mode of operation, the I/O subsystem B, regarding the source head address as a virtual address, reads out the data from the area of the memory 34 assigned by the address and transfers the data to the host subsystem A. Assume in this case that the subsystem B, prior to this transfer, applies the destination address information and the memory access information to the direct access control circuit 20A of the host subsystem A. The direct access control circuits 20A and 20B have the function of dynamic address transfer. The data transfer between the host subsystem A and the I/O subsystem B takes place in the direction assigned by the parameter ⓕ, in this case, from the I/O subsystem B to the host subsystem A. The method of use of the parameters ⓐ to ⓔ of the EXMVL instruction are the same as that in the case of an MVCL instruction. The direct memory access control circuit 20A conducts a storage protection check and dynamic data translation using the parameter ⓗ. If, however, the real mode is assigned by the parameter ⓖ, no dynamic address translation takes place. The EXMVL instruction can also be interrupted as is the case with the MVCL instruction. That is, this instruction receives an interruption at a proper joint of data, stores temporary information (a pointer of the data area, the remaining byte count, etc.) at that moment in the parameter areas ⓐ to ⓓ, sets in the former program status word the address assigning this instruction and then interrupts the execution of the instruction. When the execution is resumed, the instruction is executed, with the abovesaid parameters interpreted as if set from the beginning. In this EXMVL instruction, no overlap of the data area is effected.

The direct access control circuits 20A and 20B also have a table lookaside buffer (TLB). Upon updating of the segment table and the page table of the host subsystem A, a purge TLB instruction is issued to invalidate the TLB of the direct access control circuit 20A. The same operation is also performed on the side of the I/O subsystem B. The above has described the example in which the I/O subsystem B issues the EXMVL instruction to directly access the memory 3A of the host subsystem A, but it is a matter of course that the host subsystem can issue the EXMVL instruction to directly access the memory 3A of the I/O subsystem B. Access exceptions in the access to the memories 3A and 3B of the host subsystem A and I/O subsystem B are recognized as program exceptions by the subsystem processor having issued the EXMVL instruction.

Figure 5:
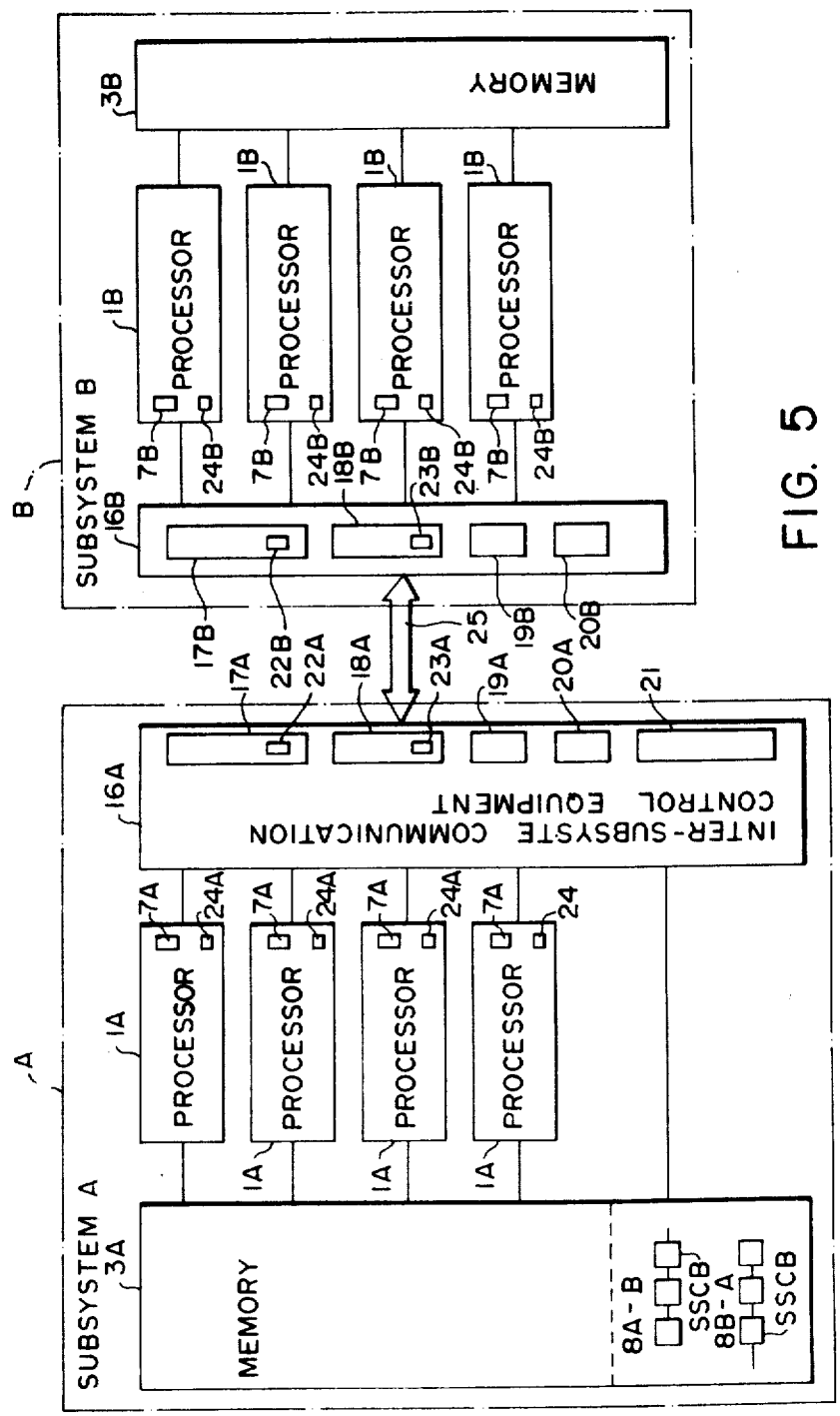
FIG. 5 is a diagram illustrating a first embodiment of the hardware structure of the inter-subsystem direct transfer system of this invention.

FIG. 5 illustrates an embodiment of the hardware construction of the inter-subsystem direct transfer system of this invention. It shows processors 1A and 1B; priority indicating registers 7A and 7B; a communication queue $8_{A-B}$ for arranging queue elements SSCB for informing the subsystem B of requests or answers from the subsystem A; a communication queue $8_{B-A}$ for arranging queue elements SSCB for informing the subsystem A of requests or answers from the subsystem B; inter-subsystem communication control 16A and 16B priority control circuits 17A and 17B; memory access control circuits 19A and 19B; a queue access control circuit 21; maximum inform priority indicating registers 22A and 22B; interruptibility indicating registers 23A and 23B; interrupt masks 24A and 24B; and an interface signal line 25.

The priority indicating registers 7A each hold the priority of a task which is currently being executed by the corresponding processor 1A; the priority indicating registers 7B each hold the priority of a task being currently executed by the corresponding processor 1B. The maximum inform priority hold circuit 22A holds a maximum value of the inform priority of the queue element SSCB in the queue $8_{B-A}$. Similarly the maximum inform priority hold circuit 22B holds a maximum value of the inform priority of the queue element SSCB in the queue $8_{A-B}$. The priority control circuit 17A updates the content of the maximum inform priority hold circuit 22A and makes an interruption request to the interrupt control circuit 18A, as will be described later.

The priority control circuit 17A checks, by the priority indicating register 7A, the priority of the task currently being executed by each processor such as 1A with its interrupt mask OFF and compares a thusly determined minimum priority value with the content of the maximum inform priority hold circuit 22A. When the latter is larger than the former, the priority control circuit 17A requests the interrupt control circuit 18A to send out of an interrupt signal. The interrupt control circuit 18A has the interruptibility indicating register 23A, which indicates whether or not it is possible to send out the interrupt signal. The interrupt control signa, under the conditions that it has received the interruption request and that the interruptibility indicating register 23A indicates the processor 1A being in the interruptible state, sends an interruption signal to the processor 1A executing the task having the minimum priority. The priority control circuit 17A, the interrupt control circuit 18B and the interruptibility indicating register 23B respectively are identical in function with the priority control circuit 17A, the interrupt control circuit 18A and the interruptibility indicating register 23A. Upon receipt of the interruption signal, the processor 1A having received the interruption signal issues a dequeue command, by which the queue elements SSCB in the queue $8_{B-A}$ are dequeued. This dequeue command is repeatedly issued until the queue $8_{B-A}$ becomes empty. The processor 1B which has received an interruption signal similarly issues a dequeue command, thereby to dequeue the queue elements SSCB in the queue $8_{A-B}$. This dequeue command is also repeatedly issued until the queue $8_{A-B}$ becomes empty. The queue $8_{A-B}$ and $8_{B-A}$ are both FIFO (first in first out) quenes.

Next, a description will be given in respect of the operation of the embodiment shown in FIG. 5. The operation will be described first with regard to the case where the subsystem A has issued an enqueue command. When the processor 1A issues an enqueue command, such queue elements SSCB as shown in FIG. 5 are produced and provided to the inter-subsystem communication control equipment 16A. The inter-subsystem communication control equipment 16A enqueues the queue elements SSCB in the queue $8_{A-B}$ and, at the same time, transfers via an interface signal line 25 the inform priority of the queue elements SSCB to the inter-subsystem communication control equipment 16B. The enqueue command terminates with the transfer of the inform priority to the inter-subsystem communication control equipment 16B. Upon receipt of the inform priority, the inter-sybsystem communication control equipment 16B of the subsystem B applies it to the priority control circuit 17B. The priority control circuit 17B sets the inform priority in the maximum inform priority circuit 22B only when the inform priority is larger than the content of the maximum inform priority circuit 22B. The priority control circuit 17B compares the content of the maximum inform priority hold circuit 22B with a minimum value of the contents of the priority indicating registers of the processors 1B with their interrupt masks OFF and, if the former is larger than the latter, applies to the interruption control circuit 18B an interruption request and the channel of the processor 1B to be interrupted. If not, the operation of the inter-subsystem communication control equipment 16B comes to an end. The interrupt control circuit 18B checks the interruptibility indicating register 22B and, if it is interruptible, issues an interruption request to the processor 1B which is executing a task of the lowest priority. If not interruptible, the operation of the inter-subsystem communication control equipment 16B is completed. The interruption control circuit 18B, if the interruption request is received by the processor 1B, sets the interruptibility indicating register 22B in its uninterruptible state. With this, the operation of the inter-subsystem communication control equipment 16B terminates.

A description will be given of the operation in the case of the subsystem A having issued a dequeue command. Having issued the dequeue command, the processor 1A provides parameters of the dequeue command to the inter-subsystem communication control equipment 16A at the same time. The inter-subsystem communication control equipment 16A drives the queue control circuit 21 and the memory access control circuit 19A to dequeue a predetermined number of queue elements SSCB from the queue $8_{B-A}$. The queue elements SSCB thus dequeue are planted via the memory access control circuit 19A in the memory area assigned by the dequeue command. The inter-subsystem communication control equipment 16A, upon each execution of the dequeue command, obtains a maximum value of the inform priority of the queue elements SSCB in the queue $8_{B-A}$ and sets the maximum value in the maximum inform priority hold resiter 22A. The inter-subsystem communication control equipment 16A checks, through the queue access control circuit 21, whether the queue $8_{B-A}$ has become empty or not. If the quene $8_{B-A}$ is found empty, the inter-subsystem communication control equipment 16A puts the interruptibility indicating register 23A in its interruptible state and, at the same time, terminates the dequene command.

In the event that the subsystem B has issued an enqueue command, the following operations take place. When the processor 1B has issued the enqueue command, queue elements SSCB as depicted in FIG. 4 are provided, which are transferred to the inter-subsystem communication control equipment 16B. The inter-subsystem communication control equipment 16B, in turn, transfers the queue elements SSCB via the interface 25 to the inter-subsystem communication control equipment 16A. The inter-subsystem communication control equipment 16A enqueues the queue elements SSCB in the queue $8_{B-A}$ through the queue access control circuit 21 and then informs the inter-subsystem communication control equipment 16 of the completion of the enqueuing through the interface 25. Upon receipt of the information, the inter-subsystem communication control equipment 16B terminates the enqueue command of the processor 1B. The inter-subsystem communication control equipment 16A sets the inform priority of the queue elements SSCB in the priority control circuit 17A. The priority control circuit 17A compares the inform priority with the content of the maximum inform priority hold circuit 22A and, if the former is larger than the latter, sets the former in the maximum priority hold circuit 22A. The priority control circuit 17A obtains a minimum one of the values of the priority registers 7A of those of the processors 1A in the subsystem A whose interrupt masks are OFF, and compares the minimum value with the content of the maximum priority hold circuit 22A and, if the latter is larger than the former, applies to the interruption control circuit 18A an interruption request and the channel of the processor to be interrupted. If the content of the maximum priority hold circuit 22A is not larger than the abovesaid minimum value, the operation of the inter-subsystem communication control equipment 16A is concluded. The interruption control circuit 18A checks the interruptibility indicating register 23A and, if it indicates an interruptible state, provides an interruption signal to the processor 1A of the channel informed from the priority control circuit 17A. In case of the processor 1A being in the uninterruptible state, the operation of the inter-subsystem communication equipment 16A comes to an end. When the interruption request is accepted by the processor 1A, the interruption control circuit 18A sets the interruptibility indicating register 23 in its uninterruptible state. With this, the operation of the inter-subsystem communication control equipment is finished.

Where the subsystem B has issued a dequeue command, the following operations take place. Upon issuance of the dequeue command from the processor 1B, parameters of the dequeue command are applied to the inter-subsystem communication control equipment 16B. The inter-subsystem communication control equipment 16B sends the parameters via the interface 25 to the inter-subsystem communication control equipment 16A and the memory access control circuit 19B. The inter-subsystem communication control equipment 16A drives the queue access control circuit 21 to dequeue a predetermined number of queue elements SSCB from the queue $8_{A-B}$ and provides the dequeued queue elements SSCB via the interface 25 to the inter-subsystem communication control equipment 16B. The inter-subsystem communication control equipment 16B sends the dequeued queue elements SSCB to the memory access control circuit 19B. The memory access control circuit 19B transfers the queue elements to the area of the memory 3B assigned by the parameters of the dequeue command. The inter-subsystem communication control equipment 16A reads out through the queue access control circuit 21 a maximum inform priority in the queue $8_{A-B}$ and information as to whether the queue has become empty or not, and applies this information via the interface 25 to the inter-subsystem communication control equipment 16B. The inter-subsystem communication control equipment 16B sets the maximum inform priority hold register 22B. In the event of having received the information that the queue is empty, the inter-subsystem communication control equipment 16B sets the interruptibility indicating register 23B in the interruptible state. Thus, the inter-subsystem communication control equipment 16B terminates the dequeue command.

When the processor 1A or 1B has issued an instruction for modifying the value of the priority indicating register 7A or 7B, the following operations take place. Since the subsystems A and B are identical in operation with each other, the following description will be given of the subsystem A. When the processor 1A has issued an instruction for modifying the value of the priority indicating register 7A, the value of the latter is updated and, at the same time, a new value is applied to the inter-subsystem communication control equipment 16A, with which the abovesaid instruction terminates. The priority control circuit 17A compares the value of the maximum inform priority hold circuit 22A with a minimum one of the values of the priority indicating register 7A of those of the processors 1A whose interrupt masks are OFF, and if the former is larger than the latter, applies to the interuption control circuit 18A an interruption request and the channel of the processor 1A to be interrupted. Thereafter, the same operations as those described above take place.

A description will be made of the operation in the case of the processor 1A or 1B having made the interrupt mask 24A or 24B interruptible. As the subsystems A and B perform the same operation in this case, the following will describe the operation of the subsystem A. When the processor 1A sets the interrupt mask 24A in its interruptible state, the processor 1A informs the inter-subsystem communication control equipment 16A of the setting. The inter-subsystem communication control equipment 16A puts the interruptibility indicating register 23A of the interruption control circuit 18A in its interruptible state, and drives the priority control circuit 17A. The priority control circuit 17A compares a minimum one of the values of the priority indicating registers 7A with the value of the maximum inform priority hold register 22A and, if the former is smaller than the latter, applies to the interruption control circuit 18A an interruption request and the channel of the processor to be interrupted. If the abovesaid minimum value is not smaller than the value of the maximum inform priority hold register 22A, the operation of the inter-subsystem communication control equipment is finished. Thereafter, the same operations as those described above are carried out.

When the host subsystem A issues a request to the I/O subsystem B, the PSW key, the segment size, the page size, the segment address and the segment length are inserted in the queue element, as described previously. The I/O subsystem B sometimes accesses a memory of the other subsystem on the basis of the assignment by the text part of the queue element.

In such an instance, the I/O subsystem B, utilizing such memory access information contained in the queue element, directly accesses the memory 3A of the host subsystem 3A to read out therefrom or write therein data. The extended move long instruction is issued in such a case.

When the processor has issued the extended move long instruction, the following operations take place. In this case, as the subsystems A and B perform the same operations, the following description will be given of the subsystem B. When the processor 1B has issued the extended move long instruction, the processor 1B applies its parameters to the inter-subsystem communication control equipment 16B. The inter-subsystem communication control equipment 16B provides the parameters to the direct access control circuit 20B and via the interface 25 to the inter-subsystem communication control equipment 16A. The inter-subsystem communication control equipment 16A applies the parameters to the direct access control circuit 20A. Thereafter, the inter-subsystem communication control equipment 16A and 16B operate in ganged relation to each other to achieve data transfer between the areas of the memories 3A and 3B of the subsystems A and B respectively specified by the parameters through the direct access control circuit 20A, the interface 25 and the direct access control circuit 20B. Upon completion of the data transfer, the inter-subsystem communication control equipment 16B terminates the extended move long instruction of the processor 1B.

Figure 6:
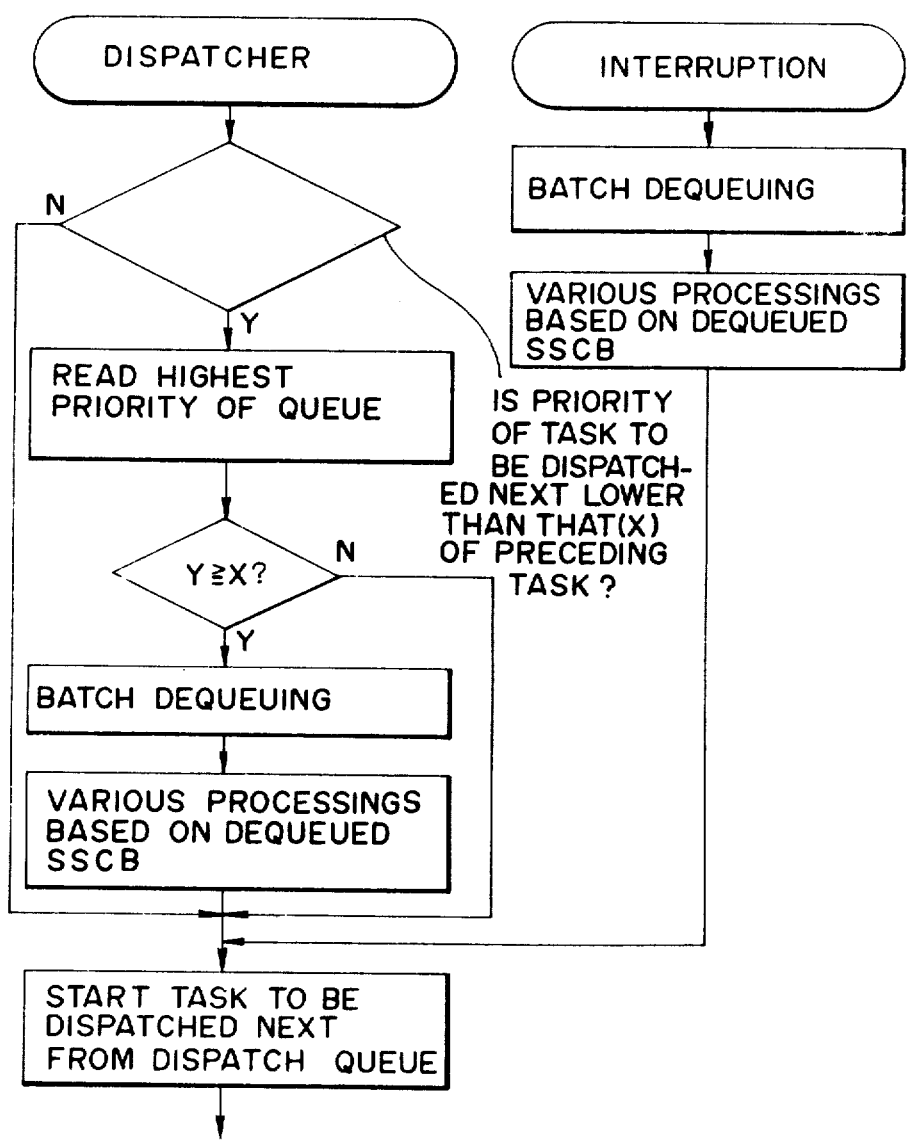
FIG. 6 is a diagram explanatory of the manner of dequeuing.

FIG. 6 is a flow chart explanatory of how depending is achieved. This shows an example of dequeuing on the side of the host subsystem. As described previously when supplied with an interruption request, the processor 1A issues a dequeue command to dequeue the queue elements SSCB from the queue $8_{B-A}$. This dequeuing operation is performed until the queue $8_{B-A}$ becomes empty. That is, batch dequeuing takes place. Then, based on the dequeued queue elements SSCB, various processings are achieved. These processing include such as posting of queueing tasks, based on answer information contained in the queue elements, scheduling an exit routine in the case of indexing assignment, scheduling of an error processing routine, etc.

It is also possible to voluntarily issue a dequeue command without interruption. In the case of dispatching a task after completion of the previous one, if the priority (X) of the task to be dispatched is lower than that of the previous task, the processor 1A reads out the content (Y) of the maximum inform priority hold circuit 22A by issuing an RDQP (Read Queue Priority) instruction. If $Y \geq X$, the dequeue command is issued for batch dequeuing of the queue elements SSCB from the queue $8_{B-A}$. Then, based on the dequeued queue elements SSCB, various processings are achieved. After this, from a dispatch queue, the task to be dispatched next is started. On the side of the I/O subsystem B, dequeuing is similarly carried out. Needless to say, the host subsystem and the I/O subsystem respectively have provided therein dispatch queues (not shown). These dispatch queues and priority queues. the queue elements SSCB dequeued from the queue $8_{B-A}$ or $8_{A-B}$ are linked with the dispatch queues correspoding thereto. In this instance, the dispatch queues are rearranged in order to priority. In this rearrangement, inform priority can be adopted for the dequeued queue element SSCB or the contents of the priority indicating registers inserted as parameters can also be employed.

The inform priority of the queue elements SSCB of an answer is set in the following manner. In the following, it is assumed that the subsystem A and B are the host and the I/O subsystems, respectively. In such a case, the queue elements SSCB enqueued in the queue $8_{A-B}$ are generally representative of the content of a request of a program of the host subsystem to the I/O subsystem, while the queue elements SSCB enqueued in the queue $8_{B-A}$ are representative of an answer to the request.

In this instance, when the program of the host subsystem wants the I/O subsystem to answer back by indexing, if the I/O subsystem enqueues, as the inform priority of the answer, in the queue $8_{B-A}$ priority of the source program while running, this answer cannot be sent back by indexing to the source program.

To avoid this, in the present invention, the content of the priority indicating register having stored therein priority of the source program while running is enqueued by an enqueue command in the queue elements SSCB to that this priority can be recognized by the I/O subsystem. The I/O subsytem determines the inform priority of the answering queue elements SSCB based on the recognized priority.

An example of the concrete use of program priority is as follows:

| Priority | Space in which source program exists |
|---|---|
| 15 | Reserved |
| 14 | System space (master scheduler, time sharing system TSS, etc.) |
| 13–12 | On-line space |
| 11–10 | TSS user space |
| 9–1 | Batch space |
| 0 | Dummy |

The priority value of answering queue elements which a peripheral subsystem sends back to the host subsystem after completion of processing of a request therefrom is set to a value corresponding to priority at the time of requesting from the host subsystem. At this time, where the program of the host subsystem has issued the request designating an answer by indexing, the I/O subsystem uses, as the inform priority of an answer to the request, the value of 1 plus the priority value of the request.

Figure 7:
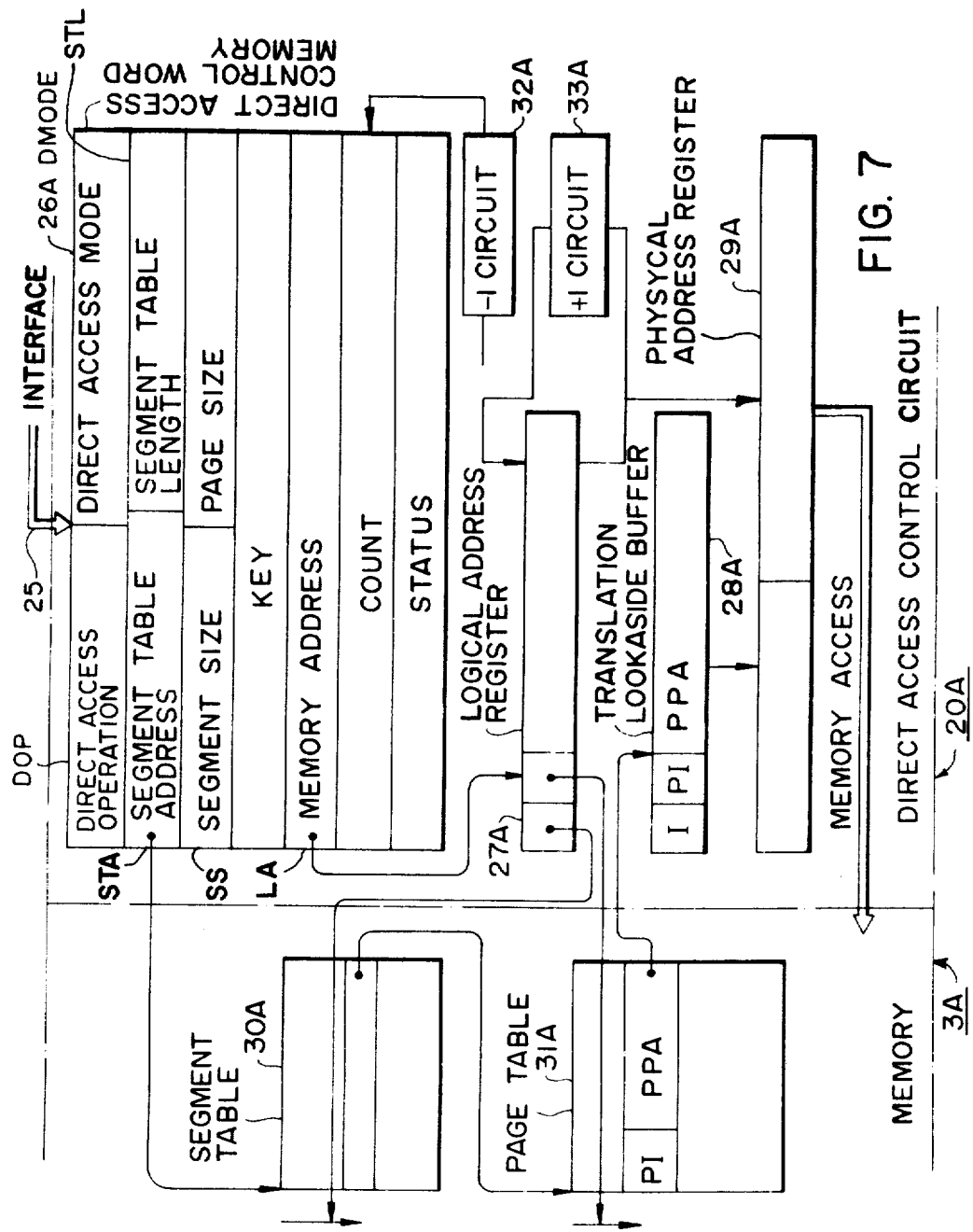
FIG. 7 is a diagram showing a dynamic address translation facility.

FIG. 7 illustrates a circuit for the dynamic address translation (DAT). For the dynamic address translation, use is made of the method set forth in patent application Ser. No. 160314 field Dec. 29, 1976, entitled "Dynamic Address Translation Equipment".

FIG. 7 indicates a direct access control word memory 26A; a logical address register 27A; a translation lookaside buffer 28A; a physical address register 29A; a segment table 30A; a page 31A; a −1 circuit 32A; a +1 circuit 33A read/write assign information DOP (Direct Access Operation); information indicating whether the dynamic address translation is to be achieved or not achieved or not DNODE (Direct Access Mode); a segment table address STA; a segment table length STL; a segment size; a page size; a PSW key KEY; a memory address LA; and a transfer data length COUNT.

A description will be made of the case where the I/O subsystem B has issued the EXMVL instruction. When the I/O subsystem has issued the EXMVL instruction, the read/write information DOP, the information DMODE indicating whether the mode of operation is a virtual one or not, the segment table STA, the segment table address length STL, the segment size SS, the page size PS, the PSW key KEY, the memory address LA and the transfer data length are transferred from the I/O subsystem B to the host subsystem A and stored in the direct access control word memory 26A of the direct access control circuit 20A. Where the virtual mode is assigned, the direct access control circuit 20A transfers the memory address LA to the logical address register 27A. By the segment table address STA, one segment table 30A is assigned and, by the segment address of the logical address, one entry in the segment table 30A is selected. According to the content of the selected entry, one page table 31A is assigned and, by the page address of the logical address, one entry of the page table 31A is selected. This entry has stored therein a page invalid bit PI and a physical address PPA. The content of the selected page table 31A is transferred to TLB 28A and its physical page address and an in-page address in the logical address register 28A are transferred to the physical address register 29A. Thus, an actual address corresponding to the logical address is formed. With this actual address, the memory 3A is accessed. Upon each transfer of 1-byte data, 1 is subtracted from the transfer data length COUNT and 1 is added to the in-page address of the logical address register 27A. Meanwhile, only when the TLB invalid bit I of the translation lookaside buffer 28A is provided, or only when the boundary of page is reached are, the segment table 30A and the page table 31A accessed to achieve the logical address to physical address translation. In the other cases, the memory 3A is accessed with the actual address in TLB 28A of the direct access control circuit 20A. The result of data transfer is stored in the STATUS part of the direct access control word memory 26A and then transferred to the I/O subsystem B.

The I bit in TLB 28A is given logic "1" in synchronism with issuance of a purge TLB instruction from the processor 1A of the host subsystem B. The I bit of logic "1" indicates that the content of TLB 28A cannot be used.

When the content of TLB 28A is rewritten, the segment table and the page invalid bit PI of the page table are checked. Where the page invalid bit PI is of logic "1", a page fault exception occurs. Further, when the memory 3A is accessed the direct access control circuit compares a key in the direct access control word memory 26A and a storage key in the memory 3A to achieve storage protection. When both keys do not match with each other, a protection exception occurs. Upon occurrence of the page fault exception or the protection exception, the direct access control circuit 20A informs the processor 1B of the I/O subsystem having issued the EXMVL instruction of the occurrence of the abovesaid phenomenon.

Where the host subsystem A has required the I/O subsystem for read-in of page data set in assigning an actual address, the I/O subsystem B is required to access the memory 3A of the host A with the actual address. In such a case, the information DMODE in the direct access control word memoey 26A is put in an actual address mode. When the information DMODE has been put in the actual address mode, no virtual address to actual address translation is achieved and the memory 3A of the host subsystem A is accessed with the memory address LA. As described previously, the result of data transfer is applied to the I/O subsystem B and, upon receipt of this information, the I/O subsystem B enqueues the queue elements SSCB of an answer in the communication queue. The host subsystem A can know the answer to the request by dequeuing the queue element SSCB of the answer.

Next, a discussion will be made of how a queue overflow state or a queue usable state is detected in simple logic for efficient queue overflow processing in the abovesaid inter-subsystem direct transfer system.

Figure 8:
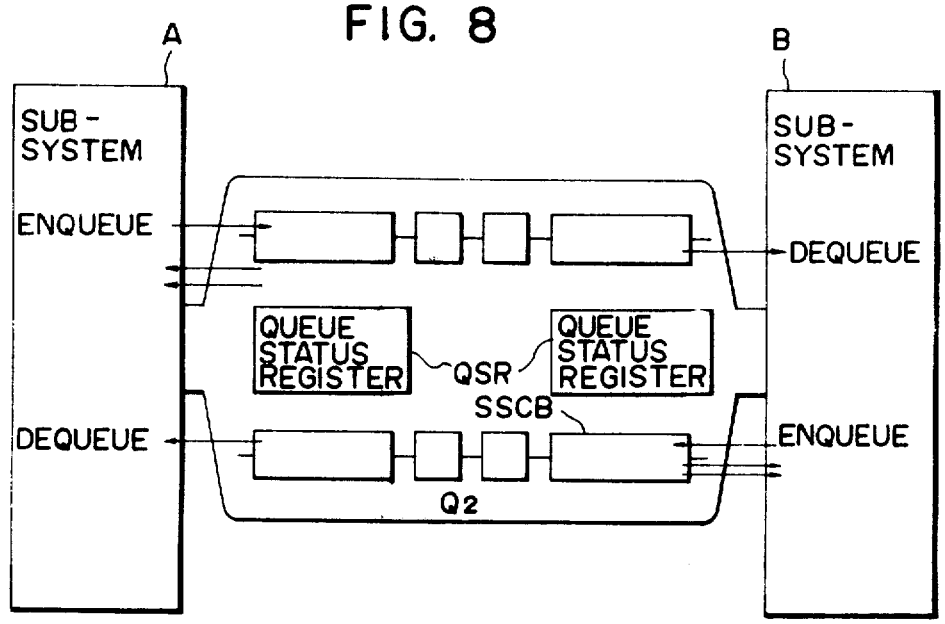
FIG. 8 is a diagram showing the outline of an inter-subsystem communication system using a queue.

FIG. 8 shows the outline of the inter-subsystem communication system employing a queue. It shows subsystems A and B; an output queue $Q_1$ for transmitting information from the subsystem A to the subsystem B; an output queue $Q_2$ for transmitting information from the subsystem B to the subsystem A; queue elements SSCB; queue status registers QSR; a queue overflow interruption ① in each subsystem; and a queue usable interruption ② in each subsystem. For example, in the case of the subsystem A applying a processing request to the subsystem B, the subsystem A issues an enqueue command to enqueue in the output queue $Q_1$ the queue elements SSCB indicating the request and the subsystem B dequeues the queue elements SSCB from the output queue $Q_1$ at a proper time. The subsystem B, after completing the processing indicated by the queue elements SSCB from the subsystem A, issues an enqueue command to enqueue in the queue $Q_2$ the queue elements SSCB of an answer, and the subsystem A dequeues the queue elements SSCB of the answer from the output queue $Q_2$.

Upon occurrence of a queue overflow exception as a result of execution of the enqueue command, the output queue $Q_1$ or $Q_2$ is put in an overflow state, as contrasted to a normal state.

Figure 9:
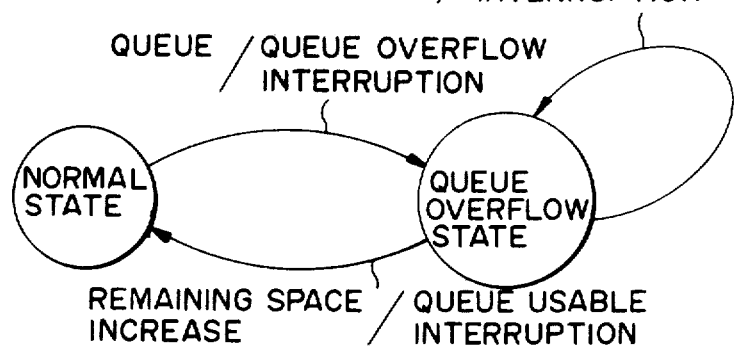
FIG. 9 is a diagram showing status transition of an output queue.

FIG. 9 is a diagram illustrating a queue state transition. It shows a queue overflow interruption, and queue usable interruption. A restoring operation from the overflow state to the normal state is achieved in the following manner. A quene in its overflow state, when the remaining space in the quene increases, requests a queue usable interruption to a processor (not shown) of the subsystem having issued the enqueue command, and if this request is accepted, the quene is released from the overflow state, When the queue is in the overflow state, if the enqueue command is issued again, the queue is held in the overflow state even if the enqueue command does not cause a quene overflow exception. Since the queue elements SSCB have a variable length, even if an overflow exception occurs as a result of issuance of the first enqueue command, the queue elements formed by the next enqueue command may in some cases be accomodated in the queue. The state of the queue is stored in the queue status register QSR.

The queue usable interruption is achieved for that one of the processor, with the interruption mask OFF, which is executing a task of the lowest priority in the subsystem having issued the enqueue command. Where a plurality of such processors exist, an interruption is requested for any one of them.

Figure 10A:
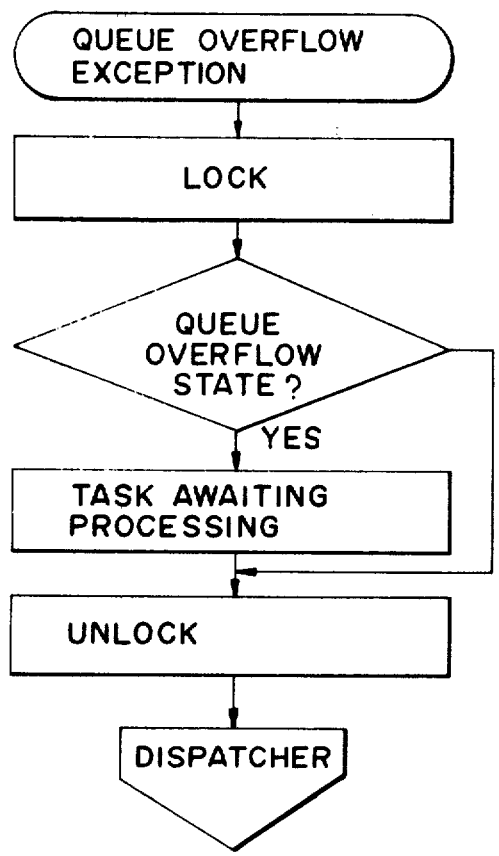
FIGS. 10A, B and C are diagrams explanatory of a queue overflow interrupt and a queue enable interrupt processing method.

FIGS. 10A, B and C are explanatory of a queue overflow interruption processing method and a queue usable interruption processing method, indicating tasks $T_1$, $T_2$, $T_3$, .... This example shows the case where there are a plurality of subsystems B which communicate with the subsystem A. As illustrated in FIG. 10C, usable interruption awaiting queues, which are software queues, are provided respectively corresponding to the output queues $Q_1$, $Q_2$, ... $Q_n$.

Upon occurrence of a queue overflow exception, the processor having issued the enqueue command locks a program routine for operating the usable interruption awaiting queue, excluding intervention of other processors. The abovesaid processor checks the state of the output queue with an RDQS (Read Queue Status) instruction to make sure that the output queue is in the queue overflow state and then achieves task awaiting processing. It is a matter of course that tasks are linked with the usable interruption queue corresponding to the output queue in which the queue overflow exception has occurred. Upon completion of the task awaiting processing, the abovementioned program routine is unlocked and the next processing starts.

Figure 10B:
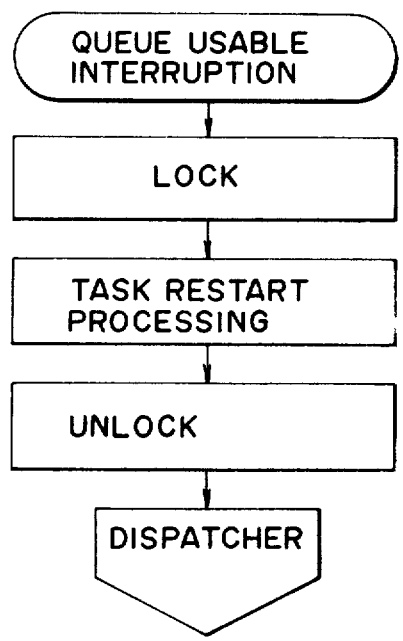
Figure 10C:
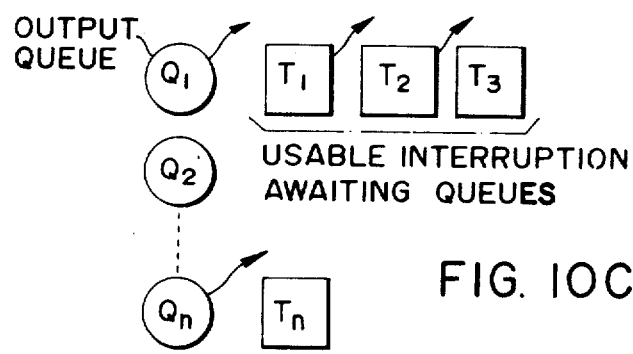

Upon occurrence of a queue usable interruption, the processor being interrupted locks the program routine for operating the usable interruption awaiting queue and releases and restarts all tasks in the usable interruption awaiting queue corresponding to the output queue, as shown in FIG. 10B. After completion of the task restart processing, the abovesaid program routine is unlocked for execution of the next processing. In FIG. 10A, the queue overflow exception is checked by the output queue state; this is to prevent that any one of the tasks is not restarted due to very small timing difference.

FIG. 11 illustrates another embodiment of the hardware structure of this invention. It shows a memory 110; output queues 111 and 112 processors 120; priority indicating registers 121; interrupt masks 122; inter-subsystem communication control equipment 130; a priority control circuit 131; queue access control circuits 132 and 133; remaining space indicating registers 134 and 136; queue status registers 135 and 137; a memory 140; processors 150; inter-subsystem communication control equipment 160; a priority control circuit 161; and an interface 170. The queues 111 and 112 respectively correspond to those $Q_1$ and $Q_2$ in FIG. 8 and the queue status register 135 corresponds to QSR.

A description will be made in respect of the operation of the system shown in FIG. 11. As the operation which is performed with respect to the queue 111 is identical with the operation related to the queue 112, only the operation of the former will be described.

Having issued an enqueue command, the processor 120 forms a queue element SSCB in accordance with a parameter of the enqueue command and transfers it to the inter-subsystem communication control equipment 130. The inter-subsystem communication control equipment 130 requests the queue access control circuit 132 to enqueue the queue elements SSCB in the queue 111. The queue access control circuit 132 compares the content of the remaining space indicating register 134 with the queue element length and, if the former is larger than or equal to the latter, enqueues the queue element SSCB in the queue 111 and decreases the content of the remaining space indicating register 134 by the queue element length. The inter-subsystem communication control equipment 130 then terminates the enqueue command. Where the content of the remaining space indicating register 134 is smaller than the queue element length, the 1-bit queue status register 135 is set to logic "1" to indicate a overflow. The inter-subsystem communication control equipment 130 requests the processor 120 having issued the enqueue command to generate an overflow interruption as a kind of operation exception and then terminates its operation.

When the processor 150 issues a dequeue command, the processor 150 applies a parameter of the dequeue command to the inter-subsystem communication control equipment 160. The inter-subsystem communication control equipment 160 applies the parameter via the interface 170 to the queue access control circuit 132 to drive it. The queue access control circuit 132 dequeues the queue element SSCB from the queue 111 in an amount designated by the parameter and provides the dequeued content via the interface 170 to the inter-subsystem communication control equipment 160. The inter-subsystem communication control equipment 160 transfer the queue elements SSCB to an area of the memory 140 assigned by the parameter terminating the command. If the queue 111 becomes empty while the queue access control circuit 132 dequeues the designated amount of queue elements SSCB, the queue access control circuit 132 finishes the dequeuing operation even if the amount of queue element dequeued has not as yet reached the value designated by the parameter. Further, the queue access control circuit 132 checks whether the content of the queue status register 135 is logic "0" or not, and if so, finishes its operation; if it is logic "1", the circuit 132 drives the priority control circuit 131. Each time a queue element SSCB is dequeued from the queue 111, the content of the remaining space indicating register 134 increases. The priority control circuit 131 checks the priority indicating registers 121 and the interrupt masks 122 for that one of the processors 120 whose interrupt mask is OFF and which is indicating the lowest priority and requests the usable interruption to this processor 120. The priority indicating registers 121 are to indicate priority of tasks executed by the processors 120. After having issued the queue usable interruption request, the inter-subsystem communication control unit 130 sets the content of the queue status register 135 to logic "0", thus completing its operation.

As is apparent from the foregoing description, according to this invention, in an inter-subsystem communication system which performs communication between subsystems through the use of communication queues, there are provided direct memory access means permitting either of the subsystems to directly access a memory of the other subsystem and when a first subsystem enqueues a queue element, memory access information necessary for access to the memory of the first subsystem is inserted in the queue element. With such an arrangement, there are obtained advantages, resulting from the use of the communication queue (such that reception of a request and an answer can be achieved without interruption and that transmission of a request and an answer can be effected without taking a busy state into account). On top of that, there are obtained advantages such that rapid data transfer between the subsystems can be achieved by the use of the direct memory access means in that when a first one of the subsystems directly accesses the memory of a second subsystem, there is no need of intervention of a processor of the first subsystem. Further, according to this invention, the memory access control information wich defines the address space of a program having issued a queue element, such as a segment table address, segment table length and the PSW key, is inserted in the queue element and the direct memory access means has a dynamic address translation function, so that one of the subsystems can access the memory of the other subsystem without the necessity of translating a virtual address to an actual one by a program. Moreover, it is possible with this invention that the memory of one of the subsystems is accessed by the other subsystem with an actual address. Furthermore, in accordance with this invention, in direct access of the memory of the one subsystem by the other subsystem, storage protection of the memory being accessed can be effected by utilizing the PSW key transmitted from the other subsystem. In addition, according to this invention, as a queue overflow state and a queue usable state are detected with simple logic, it is possible to provide an efffcient and useful inter-subsystem direct transfer system. This invention is of particular utility when employed in a system in which a queue element is of variable length.

It will be apparent that many modifications and variations may be effected without departing from the scope of the novel concepts of this invention.

What is claimed is:

1. An inter-subsystem direct transfer system for inter-subsystem communication between plural subsystems, said direct transfer system having a communication queue enqueued with queue elements by one of said subsystems selected as a source subsystem and dequeued by another one of said subsystems selected as a destination subsystem, each said subsystem having a respective processor and a respective memory, the processor of each said subsystem connected to the memory and to a respective part of said direct transfer system comprised in the same subsystem as the processor, said direct transfer system comprising
 direct memory access means located at least in part in each said subsystem for permitting each said destination subsystem to directly access a memory of said source subsystem, and
 means for each said source subsystem to insert into respective ones of said queue elements memory access information necessary for said direct accessing of the memory of said source subsystem by said destination subsystem.

2. The system of claim 1, said memory access information comprising a table address, a segment table length and a page size of a respective memory of the source subsystem and key information of a program status word, corresponding to information characterizing said source subsystem.

3. The system of claim 1 said destination subsystem comprising means for producing control information on the basis of said memory access information for said controlling of said direct accessing.

4. The system of claim 3,
 said destination subsystem comprising means for transmitting a logic address as part of said control information, and
 said direct memory access means comprising dynamic address translation means for translating said logic address according to said control informatin into an actual address for said direct accessing of the memory of the source subsystem.

5. The system of claim 4, said control information comprising mode designating information for controlling said dynamic address translation to cause said direct accessing to selectively use said logic address as an actual address.

6. The system of claim 4 or 5 comprising storage protection means, said storage protection means comprising,
 means in said source subsystem for producing a storage key,
 said memory access information for each said communication queue comprising key information of a program status word,
 said control information comprising said key information of said program status word previously transmitted from said source subsystem, and
 said dynamic address translation means comprising means for comparing said key information with said storage key.

7. An inter-subsystem direct transfer system for inter-subsystem communication of a source subsystem which enqueues a queue element in a queue of a predetermined capacity and a destination subsystem which dequeues the queue element from the queue to achieve said communication between subsystems, each said subsystem comprising a processor and a memory and means for issuing an enqueue command to generate a queue element of selected length said transfer system comprising
 means for comparing the length of said queue element with the space remaining in said queue when said source subsystem issues said enqueue command and
 means for selectively causing overflow interruption in said processor means of said source subsystem when the result of said comparing satisfies a predetermined condition.

8. The system of claim 7 comprising means for causing a queue usable interruption in said processor means of said source subsystem when the remaining space of said queue increases after the occurrence of said overflow interruption.

9. The system of claim 7 or 8, said processor of said source subsystem comprising means for generating an instruction to determine whether said queue is in said overflow state during the course of processing for said queue overflow interruption.

10. A system for communication between plural subsystems, each said subsystem comprising a processor and memory, said system comprising
- a communication queue connected to each of said subsystems, said queue being enqueued by a first of said subsystems selected as a source subsystem and dequeued by a second one of said subsystems selected as a destination subsystem,
- direct memory access means connected to each said subsystem for permitting said destination subsystem to directly access the memory in said source subsystem, and
- means located in said source subsystem for generating direct access information and
- means located in said destination subsystem for generating control information based at least in part on said direct access information for effecting said direct accessing of the memory of said source subsystem.

* * * * *

UNITED STATES PATENT AND TRADEMARK OFFICE
CERTIFICATE OF CORRECTION

PATENT NO. : 4,272,819
DATED : 9 June 1981
INVENTOR(S) : Katsumata et al

Page 1 of 3

It is certified that error appears in the above-identified patent and that said Letters Patent is hereby corrected as shown below:

Figure 8 should be deleted to appear as follows:

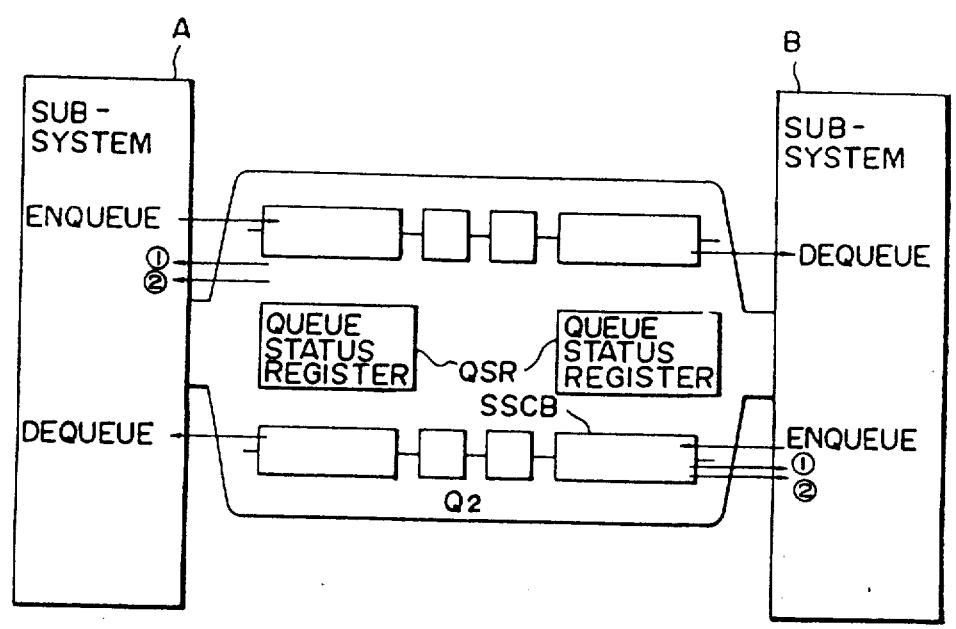

UNITED STATES PATENT AND TRADEMARK OFFICE
CERTIFICATE OF CORRECTION

PATENT NO. : 4,272,819

DATED : 9 June 1981

INVENTOR(S) : Katsumata et al

Page 2 of 3

It is certified that error appears in the above-identified patent and that said Letters Patent is hereby corrected as shown below:

```
Col. 1,   line 18, after "2;" insert --a memory 3; and an--;
          line 19, after "system" insert --4--.

Col. 2,   line 12, change "enques" to --enqueues--.

Col. 4,   line 61, change "34" to --3A--.

Col. 5,   line 34, change "3A" to --3B--;
          line 48, after "16B" insert --;--.

Col. 6,   line 12, change "signa" to --signal--;
          line 66, change "22B" to --23B--.

Col. 7,   line 5, change "22B" to --23B--.

Col. 9,   line 62, change "depending" to --dequeuing--.

Col. 10,  line 3, change "processing" to --processings--;
          line 24, change "the" to --The--;
          line 26, change "correspoding" to --corresponding--;
          line 27, change "to" to --of--.

Col. 11,  line 14, change "field" to --filed--;
          line 19, after "page" insert --table--;
          line 20, after "33A" insert --;--;
          line 23, delete "achieved or not"; change "DNODE"
             to --DMODE--;
```

UNITED STATES PATENT AND TRADEMARK OFFICE
CERTIFICATE OF CORRECTION

PATENT NO. : 4,272,819

DATED : 9 June 1981

INVENTOR(S) : Katsumata et al

Page 3 of 3

It is certified that error appears in the above-identified patent and that said Letters Patent is hereby corrected as shown below:

line 25, after "size" (first occurrence) insert --SS--; after "size" (second occurrence) insert --PS--.

Col. 12, line 22, after "host" insert --subsystem--.

Col. 13, line 6, after "state" change "," to ".";
      line 17, change "processor" to --processors--;
      line 60, after "112" insert --;--.

Col. 15, line 23, change "wich" to --which--.

Col. 16, line 19, change "informatin" to --information--.

Signed and Sealed this

Fifth Day of June 1984

[SEAL]

Attest:

GERALD J. MOSSINGHOFF

*Attesting Officer*      *Commissioner of Patents and Trademarks*